United States Patent
Lagasse

(10) Patent No.: US 7,221,812 B2
(45) Date of Patent: May 22, 2007

(54) COMPACT OPTICS ASSEMBLY FOR A QKD STATION

(75) Inventor: Michael J. Lagasse, Nahant, MA (US)

(73) Assignee: MagiQ Technologies, Inc., New York, NY (US)

( * ) Notice: Subject to any disclaimer, the term of this patent is extended or adjusted under 35 U.S.C. 154(b) by 123 days.

(21) Appl. No.: 11/052,373

(22) Filed: Feb. 7, 2005

(65) Prior Publication Data

US 2005/0189478 A1    Sep. 1, 2005

Related U.S. Application Data

(60) Provisional application No. 60/548,475, filed on Feb. 28, 2004.

(51) Int. Cl.
*G02B 6/00* (2006.01)
*G02B 27/10* (2006.01)
*G02F 1/29* (2006.01)

(52) U.S. Cl. .................. 385/11; 359/301; 359/495

(58) Field of Classification Search ................. None
See application file for complete search history.

(56) References Cited

U.S. PATENT DOCUMENTS

| 5,307,410 A | 4/1994 | Bennett |
| 6,188,768 B1 | 2/2001 | Bethune et al. |
| 6,289,104 B1 * | 9/2001 | Patterson et al. ........... 380/283 |
| 6,438,234 B1 | 8/2002 | Gisin et al. |
| 6,819,405 B2 * | 11/2004 | Mulkens et al. ............. 355/75 |
| 2002/0030893 A1 * | 3/2002 | Dewald et al. ............ 359/618 |

OTHER PUBLICATIONS

Chiangga et al, "Towards Practical Quantum Cryptography" Appl. phys. B 69, 389-393 (1999), USA.
Bennett et al. "Quantum Cryptography: Public Key Distribution and Coin Tossing," Int. Conf. Comp. Syst. & Sig. Procc. Bangalore, India Dec. 10-12, 1992.
Bethune et al., "Auto Compensating Quantum Cryptography," New Journal of Physics, 4 (2002) 421-425 (Germany).
Bennett, "Quantum Cryptography Using any two non-ortho-gonal States," phys. rev. lett vol. 68, No. 21 May 1992 (US).

* cited by examiner

*Primary Examiner*—Michelle Connelly-Cushwa
*Assistant Examiner*—Omar Rojas
(74) *Attorney, Agent, or Firm*—Opticus IP Law PLLC

(57) ABSTRACT

A bulk-optics assembly for a transmitting/receiving QKD station (BOB1) in a two-way autocompensating QKD system (101) is disclosed. The assembly consists of a first beamsplitter (104) having a high (e.g., 90:10) beamsplitting ratio, a 50:50 beamsplitter (106) and a polarizing beamsplitter (108). The assembly also optionally includes a polarizer (102), and/or a fixed attenuator (FOA), and/or an optional blocking filter (110) downstream of the polarizing beamsplitter. The compact bulk-optics assembly is easier to manufacture than a fiber-based optical system, and is simpler and more compact than prior art bulk-optics assemblies for QKD systems.

12 Claims, 4 Drawing Sheets

US 7,221,812 B2

COMPACT OPTICS ASSEMBLY FOR A QKD STATION

CLAIM OF PRIORITY

This patent application claims priority from U.S. Provisional Patent Application Ser. No. 60/548,475, filed on Feb. 28, 2004.

FIELD OF THE INVENTION

The present invention relates to quantum cryptography, and in particular relates to the optics layer in the transmitting/receiving station of a two-way quantum key distribution (QKD) system.

BACKGROUND OF THE INVENTION

Quantum key distribution involves establishing a key between a sender ("Alice") and a receiver ("Bob") by using weak (e.g., 0.1 photon on average) optical signals transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175–179 (IEEE, New York, 1984). Specific QKD systems are described in U.S. Pat. No. 5,307,410 to Bennett, and in the article by C. H. Bennett entitled "Quantum Cryptography Using Any Two Non-Orthogonal States," Phys. Rev. Lett. 68 3121 (1992) (hereinafter, "the Bennett 1992 paper"). The general process for performing QKD is also described in the book by Bouwmeester et al., "The Physics of Quantum Information," Springer-Verlag 2001, in Section 2.3, pages 27–33.

The above mentioned publications and patent each describe a so-called "one-way" QKD system wherein Alice randomly encodes the polarization or phase of single photons, and Bob randomly measures the polarization or phase of the photons. The one-way system described in the Bennett 1992 paper and in the '410 patent is based on two optical fiber Mach-Zehnder interferometers. Respective parts of the interferometric system are accessible by Alice and Bob so that each can control the phase of the interferometer. The signals (pulses) sent from Alice to Bob are time-multiplexed and follow different paths. As a consequence, the interferometers need to be actively stabilized during transmission to compensate for thermal drifts.

U.S. Pat. No. 6,438,234 to Gisin (the '234 patent), which patent is incorporated herein by reference, discloses a so-called "two-way" QKD system that is autocompensated for polarization and thermal variations. Thus, the two-way QKD system of the '234 patent is less susceptible to environmental effects than a one-way system.

FIG. 1 is a schematic diagram of a two-way QKD system 10 that includes a conventional fiber-optic-based QKD station BOB, as disclosed in FIG. 4 of the article by Bethune and Park, "Autocompensating quantum cryptography," New Journal of Physics 4, (2002) 42.1–42.15 (hereinafter, "the Bethune Article") which Article is incorporated by reference herein. QKD transmitter BOB serves as a transmitter and receiver and includes a distributed feedback (DFB) laser 12, a variable optical attenuator (VOA) 14, a polarization controller 16 and a circulator 18, coupled in series via sections of optical fiber 20.

One port of circulator 18 is coupled via an optical fiber section 21 to a polarization-maintaining (PM) variable coupler 26. One port of the PM variable coupler 26 is coupled to an optical fiber section 22A that in turn is coupled to a coupler 30. Another port of coupler 26 is coupled to another optical fiber section 22B that includes a phase modulator 34. Optical fiber section 22B is also coupled to coupler 30. A third port of coupler 26 is coupled to an optical fiber section 40 that leads to a first single-photon detector (SPD) D1. Also, one of the ports of circulator 18 is coupled to an optical fiber 42 that leads to a second SPD D2. SPDs D1 and D2 are coupled to a controller 50. Controller 50 is also coupled to phase modulator 34.

In operation, light pulses P0 are emitted by laser 12 and attenuated by VOA 14. The attenuated light pulses are then polarized by polarization controller 16. Circulator 18 passes the pulses to PM variable coupler 26. At PM variable coupler 26, each light pulse is split into two light pulses PA and PB having different polarizations, with one light pulse (say, PA) directed to optical fiber section 22A, while the other light pulse (PB) is directed to optical fiber section 22B. Because pulses PA and PB are outgoing, pulse PB remains unmodulated by phase modulator 34. These pulses are then re-introduced into optical fiber channel 60 at coupler 30 with a relative time delay.

Pulses PA and PB travel over fiber channel 60 to a second QKD station ALICE, where one of the pulses (say, PB) is randomly phase-modulated by a second phase-modulator 70 after reflecting from a Faraday mirror 72, which rotates the polarizations of the pulses by 90°. Pulses PA and PB then travel back to BOB over fiber channel 60. At coupler 30 pulse PA is directed into fiber section 22B, where it is randomly phase modulated by phase modulator 34 via the operation of controller 50. Because pulse PA now is time-delayed by the same amount as pulse PB, it combines with pulse PB at PM variable coupler 26, where the pulses interfere with one another. Depending on the relative phase imparted to the pulses, the resulting combined pulse will either travel over optical fiber section 40 to SPD D1 or over optical fiber section 42 to SPD D2. The detection events are then counted as clicks in controller 50. These clicks are then processed using known techniques (e.g., sifting, error correction and privacy amplification), to create a secret quantum key shared by BOB and ALICE.

The fiber-based optical system of BOB has a number of significant drawbacks. First, there are a large number of optical fiber splices, which results in losses in the system. Second, system is not particularly compact because of the lengths of optical fibers needed to connect the various components. Third, the extinction ratio, while good, is difficult to improve in the optical fiber-based configuration.

While the Bethune Article also offers a bulk-optics configuration as shown in FIG. 1 therein, it requires six elements including Faraday rotators and waveplates, and does not include certain elements that should be included in a bulk-optics embodiment of BOB1's optic's layer to be used in a commercially viable QKD system.

SUMMARY OF THE INVENTION

A first aspect of the invention is an optical assembly for a QKD station. The assembly consists of, in order along an optical axis, a polarizer, a first beamsplitter having at least a 90:10 beamsplitting ratio, a second beamsplitter having a 50:50 beamsplitting ratio and arranged to receive light that passes through the first beamsplitter along the optical axis, and a third beamsplitter that is a polarizing beamsplitter and that is arranged to receive light that passes through the second beamsplitter along the optical axis.

A second aspect of the invention is an optical assembly similar to the first aspect of the invention, but without the polarizer, so that the assembly consists of only three beamsplitters within a housing.

A third aspect of the invention is a QKD station. The station includes a laser adapted to emit pulses of light, and a compact optical assembly coupled to the laser at a first port. The compact optical assembly consists of a polarizer, a first beamsplitter having at least a 90:10 beamsplitting ratio, a second beamsplitter having a 50:50 beamsplitting ratio, and a third beamsplitter that is a polarizing beamsplitter. The assembly has a number of ports that serve as optical couplers so that optical fiber sections can be coupled to the beamsplitters.

Figure 1:
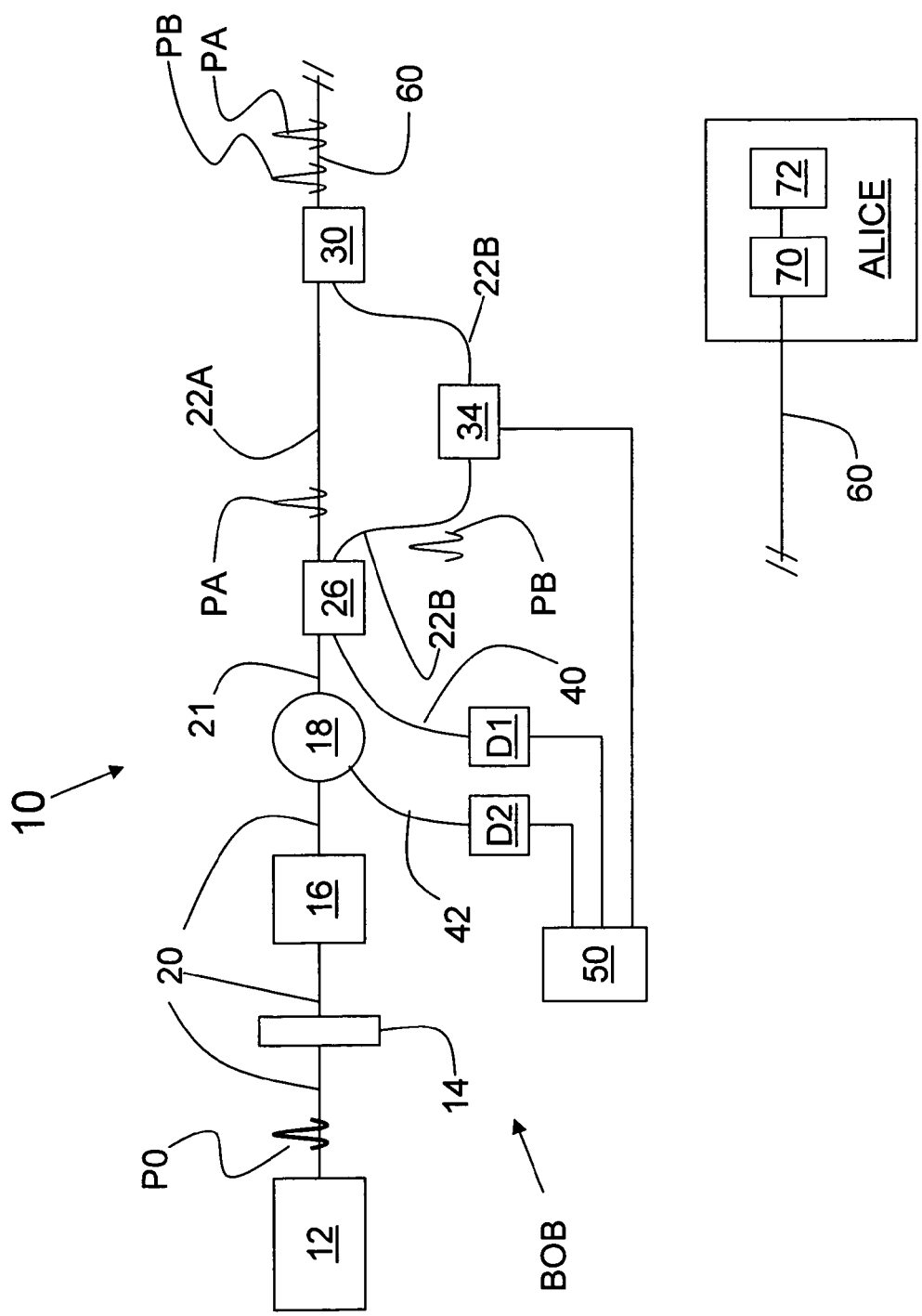
FIG. 1 is a schematic diagram of a prior-art two-way QKD system having a conventional fiber-optics-based QKD stations BOB and ALICE.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

DETAILED DESCRIPTION OF THE INVENTION

Figure 2:
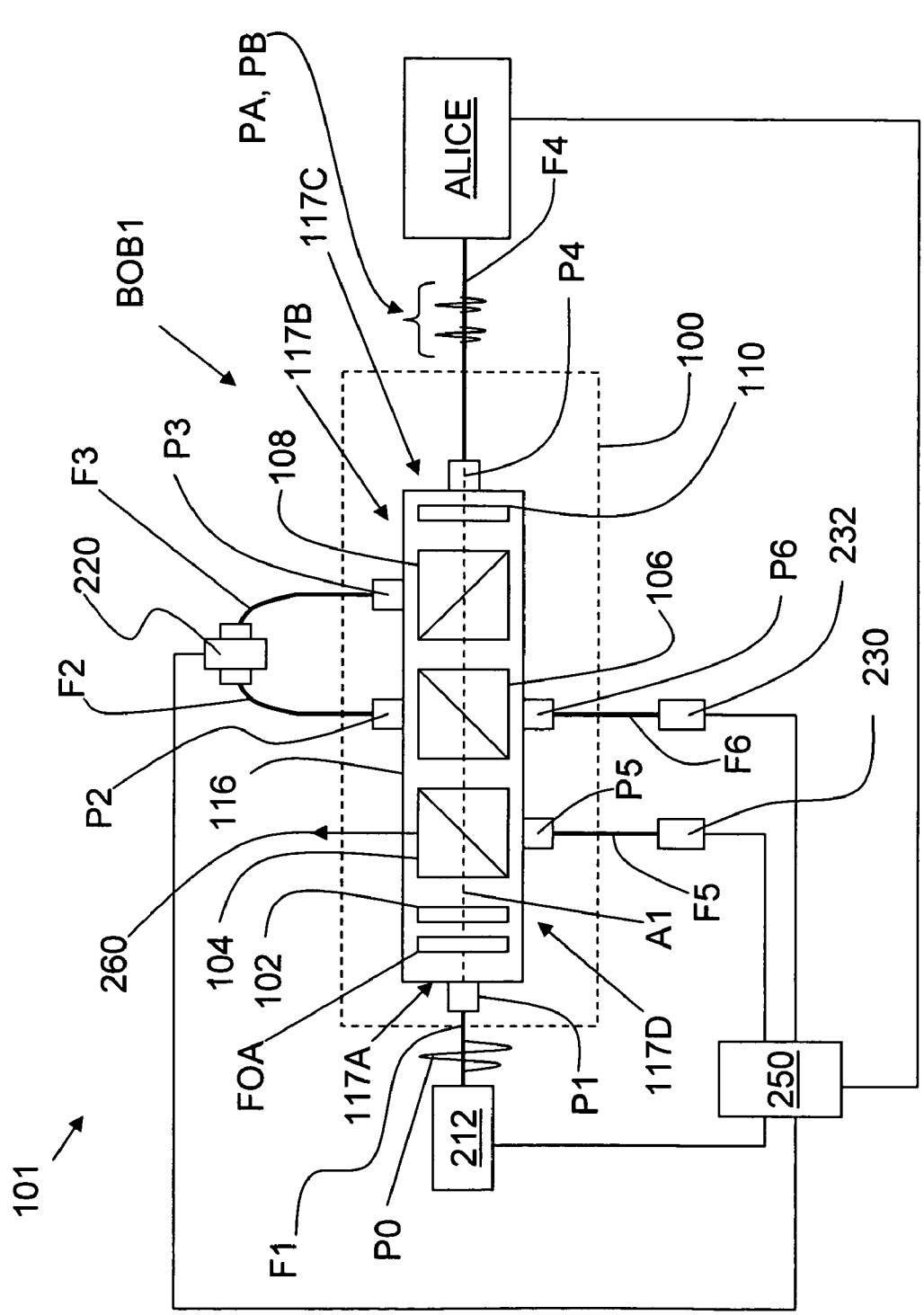
FIG. 2 is a schematic diagram of an example embodiment of the compact QKD optical assembly of the present invention as part of a two-way QKD system having a compact QKD station BOB1 according to the present invention.

FIG. 2 is a schematic diagram of an example embodiment of the compact QKD optical assembly 100 of the present invention as part of a QKD system 101 that includes a compact QKD station BOB1 according to the present invention. Assembly 100 includes, in order along an optical axis A1 from left to right, an optional fixed optical attenuator FOA (e.g., having an attenuation of about 10 dB to 20 dB), a polarizer 102, a beamsplitter 104 having a high beam splitting ratio (e.g., 90:10 or greater, such as 99:1), a 50:50 beamsplitter 106, a polarizing beamsplitter 108, and an optional optical filter 110.

In an example embodiment, elements FOA and 102 through 110 are in contact so that there are no airspaces between them. In another example embodiment, some or all of the elements are separated from one another, as shown in FIG. 2, and include antireflection (AR) coatings on the element faces on which light is incident.

Elements FOA and 102 through 110 are held in place within a housing 116 having sides 117A, 117B, 117C and 117D. In an example embodiment, housing 116 is made of metal, and elements FOA and 102 through 110 are fixed to the housing with epoxy.

Figure 3:
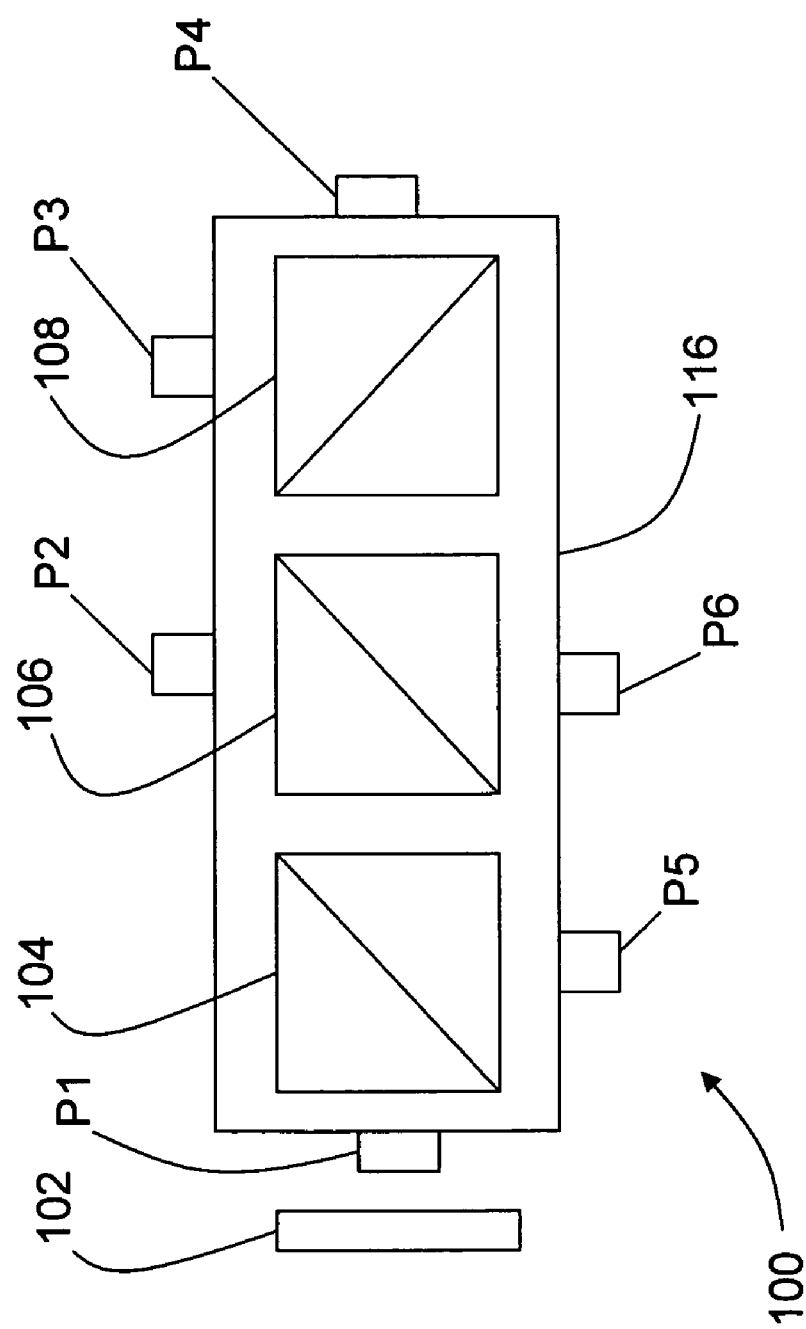
FIG. 3 is a schematic diagram of an example embodiment similar to that of FIG. 2, but wherein the polarizer is arranged outside of the housing so that the assembly consists of three prisms within the housing.

In an example embodiment of assembly 100 illustrated in FIG. 3, polarizer 102 is not present and is external to housing 116. This embodiment allows for an assembly 100 that consists of three prisms 104, 106 and 108 within housing 116.

In an example embodiment, beamsplitters 104, 106 and 108 are made of glass, such as BK-7 or other suitable optical-quality glass, capable of efficiently transmitting light having a wavelength of 1550 nm. Also in an example embodiment, each beamsplitter is a cube having a dimension of about 0.375" on a side. In another example embodiment, housing 116 has overall dimensions of about 3"×0.6"×0.6×.

With reference to FIGS. 2 and 3, assembly 100 includes a first port P1 at side 117A that serves as an input port. Assembly 100 also includes second and third ports P2 and P3 at side 117B and adjacent beamsplitters 106 and 108 respectively. Assembly 100 also includes at side 117C a fourth port P4 coupled to optional optical filter 110, if present, or alternative, adjacent beamsplitter 108. Assembly 100 further includes fifth and sixth ports P5 and P6 at side 117D adjacent beamsplitters 106 and 104, respectively.

With continuing reference to FIG. 2, in an example embodiment, ports P1–P6 are fiber optic couplers adapted to optically couple one end of an optical fiber section to the adjacent optical element within housing 116. In an example embodiment, ports P1–P6 and are fiber optic couplers adapted to collimate light from the optical fiber to form a collimated light beam. The collimated light beam is then transmitted to the adjacent element in the assembly. Likewise, ports P1–P6 as fiber optic couplers are adapted to receive collimated light from an optical element within housing 116 and focus the light so that it is coupled into an optical fiber connected to the port. In an example embodiment, ports P1–P6 include a lens, such a gradient-index (GRIN) lens, that serve as a collimating lens between the optical fiber and the corresponding element in assembly 100. Also in an example embodiment, ports P1–P6 as fiber optic couplers are adjustable to adjust the direction the light travels through assembly 100. Example adjustable fiber optic couplers suitable for use with the present invention are described in the article by Garland Best and Omur M. Sezerman, entitled "Shedding light on hybrid optics: A tutorial in coupling," *Optics and Photonics News*, February 1999 (pp. 30–34), which article is incorporated by reference herein. In an example embodiment, light is transmitted along the slow axis of the optical fiber sections, in accordance with standard industry practice.

QKD optical assembly 100 serves as a compact optical layer for a QKD station BOB1 as part of two-way QKD system 101 similar to QKD system 10 discussed above in connection with FIG. 1. With continuing reference to FIG. 2, QKD station BOB1 includes a laser source 212 coupled to a first optical fiber section F1, which in turn is coupled to port P1. BOB1 also includes optical fiber sections F2 and F3 respectively coupled to ports P2 and P3. Optical fiber sections F2 and F3 are also respectively coupled to a phase modulator 220 to complete the optical path between ports P2 and P3. BOB1 also includes single-photon detectors (SPDs) 230 and 232 coupled to ports P5 and P6 via optical fiber sections F5 and F6. Thus, ports P5 and P6 are also referred to herein as "detector ports."

An optical fiber section F4 is also coupled to port P4, and F4 represents (i.e., carries) the quantum channel between BOB1 and ALICE in QKD system 101. In an example embodiment, optical fiber sections F1, F2, and F3 are polarization-maintaining (PM) fibers, while optical fiber sections F4, F5 and F6 are single-mode (SM) fibers. QKD system 101 also includes a controller 250 operably coupled to SPDs 230 and 232, to phase modulator 220, and to laser source 212, wherein the controller is adapted to control and coordinate the operation of these elements. Controller 250 is also coupled to ALICE so that the operation of BOB1 and ALICE are synchronized.

With continuing reference to FIG. 2, in the operation of QKD system 101 and in particular assembly 100, controller 250 activates light source 212 to emit light pulses P0, which travel down optical fiber section F1. The light pulses P0 in optical fiber section F1 enter optics assembly 100 via port P1 and, in an example embodiment, are attenuated by the optional fixed optical attenuator FOA if this element is present. The (attenuated) light pulses then pass through polarizer 102, which polarizes the pulses in the polarization direction of polarizing beamsplitter 108. The polarized light pulses P0 proceed to beamsplitter 104, which in this phase of operation first serves as an attenuator that dumps a large portion (e.g., 90% or more) of the light, as indicated by arrow 260.

The now-attenuated pulses P0 then proceed to 50:50 beamsplitter 106, which splits each pulse P0 into pulses PA and PB, with pulse PB directed to port P2, while the other pulse PA continues along axis A1 to polarizing beamsplitter 108 and then therethrough. Pulse PB travels over optical fiber section F2, passes through phase modulator 220 (which at this point simply transmits the pulse), travels over optical fiber section F3 and through port P3 to polarizing beamsplitter 108, where it is directed along optical axis A1 behind pulse PA. Optical fiber section F3 is twisted such that the polarization of light entering the fiber section is rotated by 90° as compared to light leaving the fiber section. Pulses PA and PB, now orthogonally polarized and separated with pulse PA in the lead, pass through optional optical filter 110, if this element is present. The pulses then leave assembly 100 via port P4 and enter the quantum channel i.e., optical fiber F4.

Pulses PA and PB travel to ALICE, where the pulses are attenuated down to be weak pulses (i.e., single-photon or below, on average). At ALICE, one of the pulses (say PB) is phase modulated by ALICE based on a phase randomly selected from a set of possible phase modulations. The polarizations of pulses PA and PB are also rotated by 90° at ALICE (see FIG. 1). The weak pulses PA and PB travel back to BOB1 over optical fiber F4 and re-enter assembly 100 via port P4. The pulses pass through optional optical filter 110 (if present) and to polarizing beamsplitter 108. Pulse PA is now directed by polarizing beamsplitter 108 to pass through port P3 and to proceed to phase modulator 220 via optical fiber section F3, and then back to port P2 via optical fiber section F2. While pulse PA is passing through phase modulator 220, controller 250 activates the phase modulator to impart a phase randomly selected from a select group of possible phase modulations. Meanwhile, pulse PB travels directly through polarizing beam splitter 108, and the two pulses are combined at 50:50 beamsplitter 106 to form a recombined pulse P0' (not shown).

Depending on the relative phases imparted to pulses PA and PB, the recombined pulse P0' will either proceed to SPD 230 via port P5 or to SPD 232 via port P6. The arrival of a recombined pulse at either of the SPDs is recorded by controller 250 as clicks. These clicks are then processed using known techniques (e.g., sifting, error correction and privacy amplification), to create a secret quantum key shared by BOB1 and ALICE.

It should be noted that in the operation of QKD system 101, the same pulse may be modulated by BOB1 and ALICE. This is because it is only the relative phase of the interfered pulses that matters, not the phase imparted to any one pulse in particular.

Optional optical filter 110 is present to block light generated by Raman scattering in optical fiber F4 created by the relatively strong (e.g., a thousand photons) outgoing pulses PA and PB. Without optical filter 110, light from Raman scattering can return to BOB1 and activate detectors SPD 230 and/or 232 to create false detection events. Also, optical filter 110 is designed to block photons generated by the SPD during a detection event from leaving BOB1. Such photons may contain information about what is happening inside of BOB1. In an example embodiment, optical filter 110 passes the quantum signal wavelength (e.g., 1550 nm) while blocking all other wavelengths. In another example embodiment, optical filter 110 passes both the quantum signal wavelength (e.g., 1550 nm) as well as another wavelength such as for the timing and synchronization (e.g., 1310 nm), while blocking other wavelengths. In an example embodiment, optical filter 100 has a bandwidth of about 200 GHz centered about the quantum signal frequency.

Note that optical assembly 100 of FIG. 3 operates in the same way as assembly 100 of FIG. 2, except that polarizer 102 is external to housing 116 so that the assembly consists of only three prisms 104, 106 and 108 within housing 116.

CIRCULATOR EMBODIMENT

Figure 4:
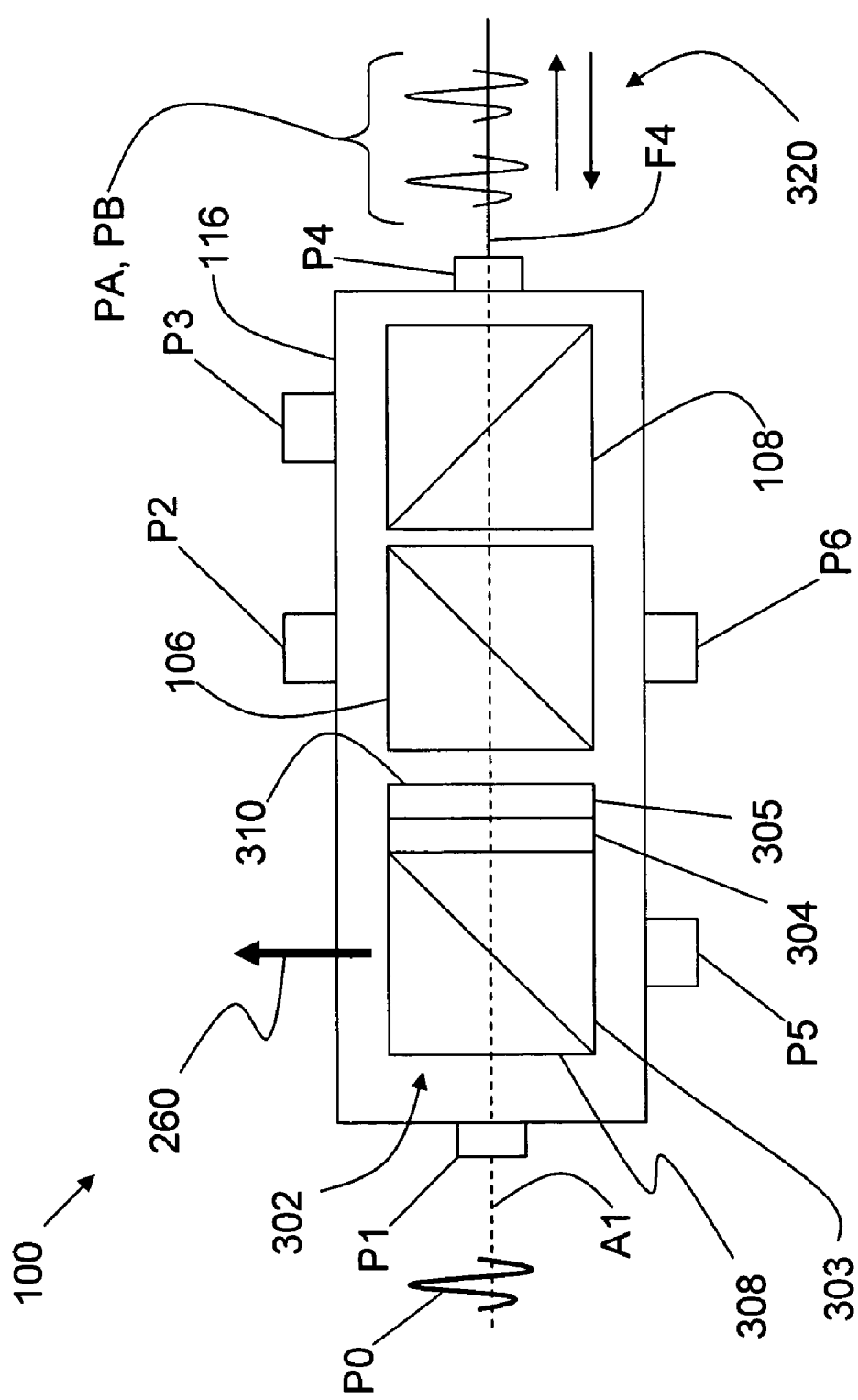
FIG. 4 is a schematic diagram similar to FIG. 2, but showing second example embodiment of the compact QKD optical assembly of the present invention.

FIG. 4 is a schematic diagram similar to FIG. 2, but showing second example embodiment of the compact QKD optical assembly 100 of the present invention, wherein the polarizer 102 and beamsplitter 104 of FIG. 2 is replaced by a circulator 302 that includes a polarizing beamsplitter 303, a Faraday rotator 304 and a half-wave plate 305. Circulator 302 has a first input face 308 and an opposing second input face 310. First input face 308 receives input pulses P0, while second input face 310 receives the recombined pulse P0' formed from modulated pulses PA and PB that travel to and from assembly 100 over fiber section F4, as described above in connection with FIG. 2, and as indicated by arrows 320.

In an example embodiment, circulator faces 308 and 310 include an antireflection coating (not shown) designed to reduce reflectivity at the wavelength of input pulses P0, such as 1550 nm.

Also, optional optical filter 110 and optional fixed optical attenuator FOA are not included in the embodiment shown FIG. 4 for the sake of illustration, and to emphasize the compact nature of optical assembly 100. Thus, in an example embodiment, assembly 100 consists of a bulk-optics circulator 302 and two beamsplitters 106 and 108.

The operation of optical assembly 100 of FIG. 4 is essentially the same as described above in connection with FIG. 2. An initial light pulse P0 is incident on polarizing beamsplitter 303 at first input face 308, where only one polarization is transmitted, i.e., the polarization that is transmitted by polarizing beamsplitter 108. The reflected polarization is dumped, as indicated by arrow 260. The transmitted polarized light then passes through Faraday rotator 304, which rotates the polarization by 45°. The light then passes through half-wave plate 305, which rotates the polarization by 45° in the clockwise direction for pulses traveling left to right, and rotates the polarization by 45° degrees in the counterclockwise direction for pulses traveling right to left. Thus, the combination of Faraday rotator 304 and half-waveplate 305 converts one polarization into the orthogonal polarization (e.g., horizontal to vertical, and vice-versa). The light pulse then travels through the system as described above in connection with FIG. 2.

For returning pulses PA and PB, the effects of the Faraday rotator 304 and half-wave plate 305 cancel each other so that circulator 302 simply acts as a polarizing beamsplitter, i.e., like polarizing beamsplitter 104 of FIG. 2.

The various embodiments of optical assembly 100 described above are advantageous in that they relatively inexpensive and easy to manufacture. Further, the modular nature of optics assembly 100 makes it easier to integrate and manufacture a QKD station for a commercial QKD system. Optical assembly 100 is also more compact than prior art assemblies so that the BOB1 QKD station in the QKD system can be made small.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein. Accordingly, other embodiments are within the scope of the appended claims.

What is claimed is:

1. An optical assembly for a QKD station, consisting of, in order along an optical axis:
   a polarizer;
   a first beamsplitter having at least a 90:10 beamsplitting ratio;
   a second beamsplitter having a 50:50 beamsplitting ratio and arranged to receive light that passes through the first beamsplitter along the optical axis; and
   a third beamsplitter that is a polarizing beamsplitter and that is arranged to receive light that passes through the second beamsplitter along the optical axis.

2. The assembly of claim 1, further consisting of a fixed attenuator arranged immediately adjacent the polarizer, wherein the fixed attenuator has an attenuation of between about 10 dB and 20 dB.

3. The assembly of claim 1, wherein the first beamsplitter has at least a 99:1 beamsplitting ratio.

4. The assembly of claim 1, further consisting of an optical filter arranged immediately downstream of the third beamsplitter.

5. The assembly of claim 1, further consisting of:
   a first port adapted to input light from a laser into the assembly at the polarizer via a first optical fiber section coupled to the first port and to the laser;
   a second port coupled to the second beamsplitter, with the second port coupled to a second optical fiber section that is coupled to a phase modulator;
   a third port coupled to the third beamsplitter, with the third port coupled to a third optical fiber section that is coupled to the phase modulator; and wherein the second and third optical fiber sections are arranged such that light having a polarization and entering or leaving the second port via the second and third optical fiber sections is rotated by 90° relative to light entering or leaving the third port.

6. The assembly of claim 5, further including:
   a first detector port coupled to the second beamsplitter, with the first detector port coupled to a fourth optical fiber section that in turn is coupled to a first single-photon detector; and
   a second detector port coupled to the first beamsplitter, with the second detector port coupled to a fifth optical fiber section that in turn is coupled to a second single-photon detector.

7. The assembly of claim 4, further including a housing that contains the polarizer, the first, second and third beamsplitters, and the optical filter, and wherein the housing has dimensions of about 3"×0.6"×0.6".

8. The assembly of claim 1, wherein the polarizer and the first, second and third beamsplitters include an antireflection coating designed to minimally reflect a quantum signal wavelength.

9. An optical assembly for QKD station, consisting of, in order along an optical axis:
   a polarizer;
   a first beamsplitter having at least a 90:10 beamsplitting ratio;
   a second beamsplitter having a 50:50 beamsplitting ratio and arranged to receive light that passes through the first beamsplitter along the optical axis;
   a third beamsplitter that is a polarizing beamsplitter and that is arranged to receive light that passes through the second beamsplitter along the optical axis; and
   a housing that contains the first, second and third beamsplitters.

10. The assembly of claim 9, wherein the polarizer is contained within the housing.

11. A QKD station comprising:
   a compact optical assembly consisting of a polarizer, a first beamsplitter having at least a 90:10 beamsplitting ratio, a second beamsplitter having a 50:50 beamsplitting ratio, and a third beamsplitter that is a polarizing beamsplitter;
   a laser adapted to emit pulses of light and optically coupled to the polarizer;
   a phase modulator optically coupled to the second and third beamsplitters with an optical fiber arranged such that light having a polarization and entering or leaving the second beamsplitter and traveling through the phase modulator is rotated by 90° relative to light entering or leaving the third beamsplitter.

12. The QKD station of claim 11, further including:
   a first single-photon detector optically coupled to the second beamsplitter; and
   a second single-photon detector optically coupled to the third beamsplitter.

* * * * *